United States Patent
Wang et al.

(10) Patent No.: US 11,606,325 B2
(45) Date of Patent: Mar. 14, 2023

(54) MESSAGE PROCESSING METHOD AND APPARATUS

(71) Applicant: Huawei Technologies Co., Ltd., Shenzhen (CN)

(72) Inventors: Chenglu Wang, Shenzhen (CN); Haitao Zhu, Shanghai (CN); Yan Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/706,262

(22) Filed: Mar. 28, 2022

(65) Prior Publication Data

US 2022/0286422 A1 Sep. 8, 2022

Related U.S. Application Data

(63) Continuation of application No. 17/192,457, filed on Mar. 4, 2021, now Pat. No. 11,316,815, which is a
(Continued)

(30) Foreign Application Priority Data

Nov. 26, 2016 (CN) .......................... 201611057261.2

(51) Int. Cl.
*G06F 15/16* (2006.01)
*H04L 51/226* (2022.01)
(Continued)

(52) U.S. Cl.
CPC .......... *H04L 51/226* (2022.05); *H04L 51/046* (2013.01); *H04L 51/10* (2013.01); *H04L 51/216* (2022.05); *H04L 51/224* (2022.05)

(58) Field of Classification Search
CPC ....... H04L 51/26; H04L 51/046; H04L 51/10; H04L 51/16; H04L 51/24
(Continued)

(56) References Cited

U.S. PATENT DOCUMENTS 7,155,729 B1 12/2006 Andrew et al.
8,924,493 B1 * 12/2014 Yeskel .................. G06F 3/0482
709/219
(Continued)

FOREIGN PATENT DOCUMENTS

CN 1956483 A 5/2007
CN 101834949 A 9/2010
(Continued)

*Primary Examiner* — Anthony Mejia
(74) *Attorney, Agent, or Firm* — Slater Matsil, LLP

(57) ABSTRACT

Embodiments of the present invention relate to the field of communications technologies, and provide a message processing method and apparatus, to resolve a prior-art problem that intelligence of a notification message processing method is relatively low. In the embodiments of the present invention, an importance level of each application is determined based on a historical use feature of each application, and then a notification manner of a notification message of each application is determined based on the importance level of each application, so that when a notification message is received, the notification message is displayed in the notification manner corresponding to the application to which the notification message belongs. Solutions provided in the embodiments of the present invention are suitable for use during notification message processing.

20 Claims, 6 Drawing Sheets

Related U.S. Application Data continuation of application No. 16/463,557, filed as application No. PCT/CN2017/074770 on Feb. 24, 2017, now Pat. No. 10,965,636.

(51) Int. Cl.
*H04L 51/046* (2022.01)
*H04L 51/10* (2022.01)
*H04L 51/216* (2022.01)
*H04L 51/224* (2022.01)

(58) Field of Classification Search
USPC .......................................................... 709/206
See application file for complete search history.

(56) References Cited

U.S. PATENT DOCUMENTS

| | | | |
|---|---|---|---|
| 9,118,614 B1* | 8/2015 | Rogers | H04L 51/56 |
| 10,743,160 B2 | 8/2020 | Mao | |
| 11,109,198 B2 | 8/2021 | Yang et al. | |
| 2002/0198946 A1* | 12/2002 | Wang | H04L 41/0663 |
| | | | 709/206 |
| 2011/0060996 A1* | 3/2011 | Alberth, Jr. | H04L 67/306 |
| | | | 715/736 |
| 2013/0282750 A1* | 10/2013 | Paul | G06F 16/334 |
| | | | 707/767 |
| 2014/0189030 A1 | 7/2014 | Benchenaa et al. | |
| 2014/0189533 A1* | 7/2014 | Krack | G06F 3/0481 |
| | | | 715/753 |
| 2014/0282003 A1* | 9/2014 | Gruber | G06F 3/165 |
| | | | 715/727 |
| 2015/0188871 A1* | 7/2015 | Lewis | H04L 67/55 |
| | | | 709/207 |
| 2015/0223200 A1* | 8/2015 | Kim | H04W 68/02 |
| | | | 455/458 |
| 2015/0334061 A1* | 11/2015 | Baird | H04L 51/23 |
| | | | 709/206 |
| 2016/0086241 A1* | 3/2016 | Proulx | G06F 3/0481 |
| | | | 705/26.4 |
| 2016/0203415 A1 | 7/2016 | Chaiyochlarb et al. | |
| 2016/0315902 A1* | 10/2016 | Silva et al. | G06Q 30/0269 |
| 2016/0366569 A1 | 12/2016 | Wu et al. | |
| 2017/0185650 A1* | 6/2017 | Vainas | G06F 16/24575 |
| 2017/0344092 A1* | 11/2017 | Bluestein | G06F 1/3212 |
| 2018/0040229 A1* | 2/2018 | Munusamy | H04W 4/80 |
| 2018/0335968 A1* | 11/2018 | Pauley | G06F 3/068 |
| 2018/0325251 A1 | 12/2018 | Luna et al. | |
| 2018/0352515 A1* | 12/2018 | Luna | G06F 1/3278 |
| 2019/0334848 A1* | 10/2019 | Chen | H04L 51/226 |
| 2020/0220969 A1* | 7/2020 | Jonsson | G06F 9/542 |

FOREIGN PATENT DOCUMENTS

| | | |
|---|---|---|
| CN | 101895630 A | 11/2010 |
| CN | 103179264 A | 6/2013 |
| CN | 103634370 A | 3/2014 |
| CN | 103648084 A | 3/2014 |
| CN | 104009910 A | 8/2014 |
| CN | 104813255 A | 7/2015 |
| CN | 105187641 A | 12/2015 |
| CN | 105515953 A | 4/2016 |
| CN | 105630853 A | 6/2016 |
| CN | 105786469 A | 7/2016 |
| DK | 179328 B1 | 5/2018 |
| EP | 3151479 | 4/2017 |
| ES | 2873249 T3 | 11/2021 |
| GB | 2541641 A | 3/2017 |
| JP | 2006172464 A | 6/2006 |
| JP | 2015069230 A | 4/2015 |
| PT | 3320751 T | 2/2020 |
| WO | 2006040794 A1 | 4/2006 |

\* cited by examiner

MESSAGE PROCESSING METHOD AND APPARATUS

CROSS-REFERENCE TO RELATED APPLICATIONS

This application is a continuation of U.S. patent application Ser. No. 17/192,457, filed on Mar. 4, 2021, which is a continuation of U.S. patent Ser. No. 16/463,557, filed on May 23, 2019, now U.S. Pat. No. 10,965,636, which is a National Stage of International Application No. PCT/CN2017/074770, filed on Feb. 24, 2017, which claims priority to Chinese Patent Application No. 201611057261.2, filed on Nov. 26, 2016. All of the aforementioned patent applications are hereby incorporated by reference in their entireties.

TECHNICAL FIELD

The present invention relates to the field of communications technologies, and in particular, to a message processing method and apparatus.

BACKGROUND

With development and popularization of smartphones, various applications on smartphones provide much convenience to people's lives. Because there are more applications installed on the smartphone, there are a growing number of various notification messages such as short message service (SMS) message notifications and push messages of various applications on the smartphone. These notification messages include messages that a user really needs, and also include some spam messages such as advertisement emails and spam SMS messages. It is very inconvenient for the user to read required messages when useful messages and the spam messages are mixed together.

Currently, to manage the notification messages in the smartphone, the user may select to suppress notification messages of some applications, so that the messages of these applications are not displayed in a notification bar. Although a quantity of notification messages can be reduced by using the method, the user easily cannot see important messages in time, and useful messages and spam messages may still exist in applications that are not suppressed. Therefore, the notification message processing method in the prior art is insufficiently intelligent.

SUMMARY

Embodiments of the present invention provide a message processing method and apparatus, to resolve a prior-art problem that intelligence of a notification message processing method is relatively low.

To achieve the foregoing objective, the following technical solutions are used in the embodiments of the present invention.

According to a first aspect, an embodiment of the present invention provides a message processing method, including determining an importance level of each application based on a historical use feature of each application on a terminal, and then determining a notification manner of a notification message of each application based on the importance level of each application, so that when receiving a notification message, the terminal displays the notification message in the notification manner corresponding to the application to which the notification message belongs. It can be learned that in this embodiment of the present invention, not all the notification manners are displayed in a same manner, the importance level of each application may be determined based on a use habit of a user for each application, and the notification message of the application of each importance level corresponds to one notification manner, so that notification messages of applications with different importance levels are displayed in different notification manners. Therefore, a requirement and a habit of the user for viewing the message can be satisfied, thereby improving intelligence for processing the notification message.

In a possible design, before displaying the notification message, the terminal further needs to determine a notification time period of each application based on an online time and/or an application type of each application. The online time of the application may reflect a time spent by the user in using the application, and the notification time period of each application is determined with reference to the online time and the application type, so that the notification time period of the application satisfies the use habit of the user. In addition, the application type is considered when the notification time period is determined. For example, a notification time period of a work-type application is a working time, and a notification time period of an entertainment application is a non-working time. Therefore, processing on the notification message is more intelligent.

In a possible design, a specific method for notifying the notification message in the terminal is when receiving a notification message, determining whether a current moment is in the notification time period of the application to which the notification message belongs, and if current moment is in the notification time period of the application to which the notification message belongs, displaying the notification message in the notification manner corresponding to the application to which the notification message belongs, or if current moment is not in the notification time period of the application to which the notification message belongs, temporarily storing the notification message, and displaying, when the current moment reaches the notification time period of the application to which the notification message belongs, the notification message in the notification manner corresponding to the application to which the notification message belongs. The notification message is processed in an appropriate time segment, so that the user is prevented from being interfered by some inopportune notification messages, thereby improving the intelligence for processing the notification message.

In a possible design, the historical use feature includes at least one of use duration, a quantity of times of starting, and a quantity of application download times, and a method for determining the importance level of each application by the terminal is sorting use duration of the applications, and dividing the applications into N first type sets in descending order of the use duration, where N is a positive integer greater than 1, and serial numbers of the N first type sets are 1 to N, sorting quantities of times of starting the applications, and dividing the applications into N second type sets in descending order of the quantities of times of starting, where serial numbers of the N second type sets are 1 to N, sorting quantities of application download times of the applications, and dividing the applications into N third type sets in descending order of the quantities of application download times, where serial numbers of the N third type sets are 1 to N, and then sequentially sifting out an identical application from the first type set, the second type set, and the third type set that correspond to each serial number, to form an importance level set corresponding to each serial number, where a smaller serial number of the importance level set indicates a higher importance level of the application in the importance level set. It can be learned that the importance level of the application is determined based on the use duration of the application, so that it can be ensured that the notification message of the application frequently used by the user is notified in time. Therefore, a notification occasion of the notification message more satisfies the use habit of the user.

In a possible design, in a process in which the terminal sequentially sifts out the identical application from the first type set, the second type set, and the third type set that correspond to each serial number, to form the importance level set corresponding to each serial number, each time an identical application is sifted out from the first type set, the second type set, and the third type set that correspond to one serial number, the identical application in the first type set, the second type set, and the third type set that correspond to the current serial number needs to be used as the importance level set corresponding to the current serial number, and then applications that are not sifted out from the first type set, the second type set, and the third type set that correspond to the current serial number are respectively added to the first type set, the second type set, and the third type set that correspond to a next serial number.

In a possible design, after the terminal determines the importance level of each application based on the use duration, the quantity of times of starting, and the quantity of download times of each application on the terminal, the terminal may further receive a change instruction entered by the user, where the change instruction carries an importance level of the application, and changes, based on the change instruction, the importance level of the application that corresponds to the change instruction to the importance level carried in the change instruction. It can be learned that the terminal may automatically determine the importance level of the application based on historical data, and the user may also change the importance level of the application based on a real-time requirement of the user, so that the notification occasion of the notification message more satisfies the requirement of the user, thereby further improving the intelligence for processing the notification message.

According to another aspect, an embodiment of the present invention provides a message processing apparatus. The apparatus may implement a function performed by the terminal in the foregoing example of the method, and the function may be implemented by using hardware or may be implemented by hardware executing corresponding software. The hardware or software includes one or more modules corresponding to the foregoing function.

In a possible design, a structure of the apparatus includes a processor and a display unit. The processor is configured to enable the apparatus to perform a corresponding function in the foregoing method. The display is configured to enable the apparatus to display the notification message. The apparatus may further include a memory. The memory is configured to couple to the processor and store a necessary program instruction and necessary data of the apparatus.

According to still another aspect, an embodiment of the present invention provides a communications system. The system includes the terminal according to the foregoing aspects and a cloud server.

According to yet another aspect, an embodiment of the present invention provides a computer storage medium, configured to store a computer software instruction used by the foregoing terminal. The computer software instruction includes a program designed for performing the foregoing aspects.

Compared with the prior art, in the embodiments of the present invention, not all the notification manners are displayed in a same manner, the importance level of each application may be determined based on a use habit of a user for each application, and the notification message of the application of each importance level corresponds to one notification manner, so that notification messages of applications with different importance levels are displayed in different notification manners. Therefore, a requirement and a habit of the user for viewing the message can be satisfied, thereby improving intelligence for processing the notification message.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DETAILED DESCRIPTION OF ILLUSTRATIVE EMBODIMENTS

Network architectures and service scenarios described in the embodiments of the present invention aim to more clearly describe the technical solutions in the embodiments of the present invention, but are not intended to limit the technical solutions provided in the embodiments of the present invention. A person of ordinary skill in the art may know that as the network architectures evolve and a new service scenario emerges, the technical solutions provided in the embodiments of the present invention are further applicable to a similar technical problem.

It should be noted that in the embodiments of the present invention, the word "example" or "for example" is used to represent giving an example, an illustration, or a description. Any embodiment or design scheme described as an "example" or "for example" in the embodiments of the present invention should not be explained as being more preferred or having more advantages than another embodiment or design scheme. Exactly, use of the word "example" or "for example" or the like is intended to present a related concept in a specific manner.

It should be noted that in the embodiments of the present invention, "of", "relevant" and "corresponding" may be mixed during use sometimes. It should be noted that when a difference thereof is de-emphasized, meanings expressed by them are the same.

A terminal, also referred to as user equipment (UE), is a device providing voice and/or data connectivity to a user, for example, a handheld device or an in-vehicle device having a wireless connection function. A common terminal may, for example, include a mobile phone, a tablet computer, a notebook computer, a palmtop computer, a mobile Internet device (MID), a wearable device such as a smartwatch, a smart helmet, a smart band, or a pedometer.

Figure 1:
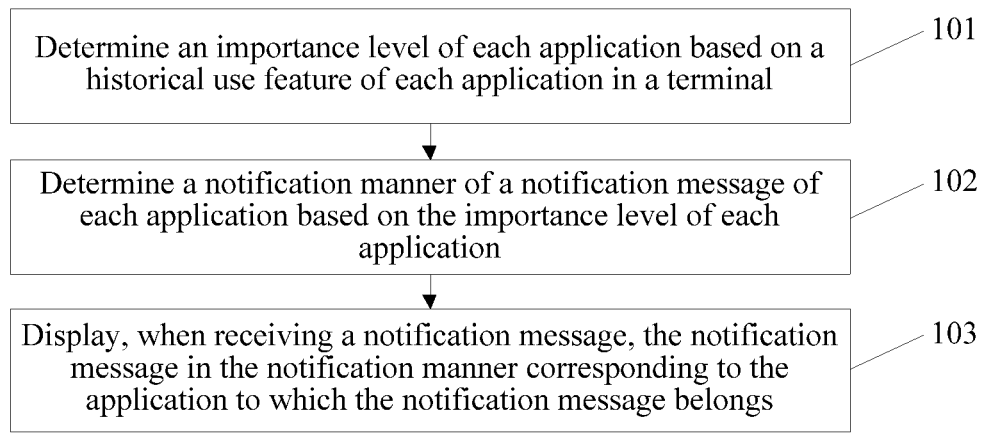
FIG. 1 is a flowchart of a message processing method according to an embodiment of the present invention.

To improve intelligence for processing a notification message, an embodiment of the present invention provides a message processing method. The method is performed by a terminal. As shown in FIG. 1, the method includes the following steps.

101. Determine an importance level of each application based on a historical use feature of each application on a terminal.

The historical use feature includes at least one of use duration, a quantity of times of starting, and a quantity of application download times of the application. The use duration of the application is accumulated use duration of the application on a foreground excluding a running time of the application on a background. The quantity of application download times is obtained by the terminal from a cloud server. The cloud server may collect statistics on a total quantity of download times of each application, to determine the quantity of application download times.

It should be noted that the use duration of each application and the quantity of times of starting may reflect a use habit of a user for the application. For example, if the user frequently starts an application, it indicates that the user often needs to use the application, so that the importance level of the application is relatively high. When a notification message of the application is received, the notification message needs to be notified in time, so that the user may see the notification message of the application in time. That is, a longer use duration, a larger quantity of times of starting, and a larger quantity of application download times of an application indicate a higher importance level of the application.

It should be further noted that the terminal periodically collects statistics on the use duration, the quantity of times of starting, and the quantity of application download times of each application, and updates the importance level of the application.

102. Determine a notification manner of a notification message of each application based on the importance level of each application.

For example, there may be three importance levels, and the three importance levels are respectively important, unimportant, and very unimportant.

The notification message of the application whose importance level is important may be prompted by using a pop-up window, and a display location of the notification message of the application whose importance level is important is before that of the notification message of the application whose importance level is unimportant.

If the terminal is in a screen-locked state, the notification message of the application whose importance level is important may be displayed on a lock screen interface by using a pop-up window.

In addition, the notification message of the application whose importance level is important may be set to be prompted at an interval before the user processes the message.

The notification message of the application whose importance level is unimportant may be displayed in a notification bar instead of being prompted by using a pop-up window.

The notification message of the application whose importance level is very unimportant may be a spam SMS message or a spam advertisement, so that the notification message may not be notified.

103. Display, when receiving a notification message, the notification message in the notification manner corresponding to the application to which the notification message belongs.

In an example, it is determined by using step 101 that for a terminal A, an importance level of WeChat is important, an importance level of a microblog is unimportant, and an importance level of QQ is very unimportant.

Figure 1A:
FIG. 1a is an example of a schematic diagram of a message processing method according to an embodiment of the present invention.

In this case, when a notification message of WeChat is received, the notification message is displayed by using a pop-up window, as shown in FIG. 1a.

Figure 1B:
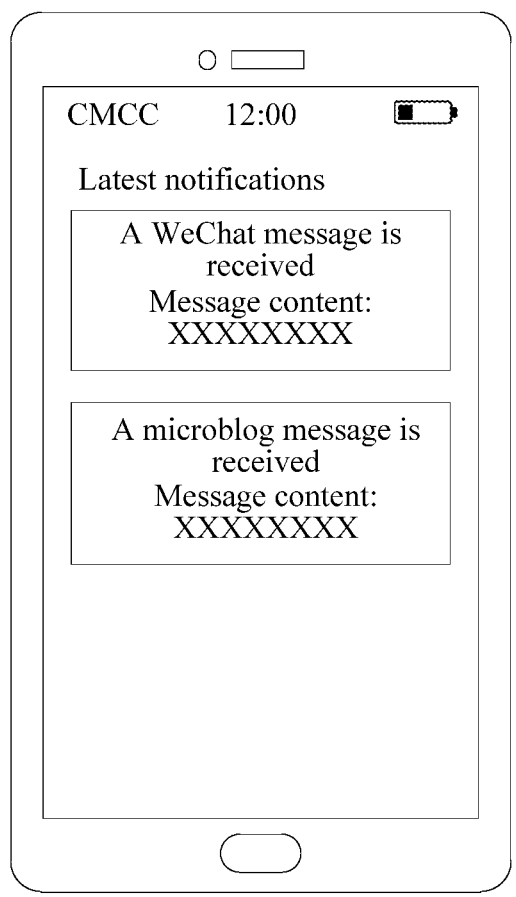
FIG. 1b is an example of a schematic diagram of another message processing method according to an embodiment of the present invention.

When a notification message of the microblog is received, the notification message is displayed in a notification bar, and if the notification message of WeChat is not processed at this time, the notification message of the microblog is located below the notification message of WeChat in the notification bar, as shown in FIG. 1B.

When a notification message of QQ is received, the terminal does not prompt a terminal message of QQ. A user may see the notification message of QQ only when opening the QQ user interface.

It should be noted that if an application has various types of notification messages, a notification policy of each type of the notification message may be preset. For example, an update message of the application may be set to be prompted when the application is started, and a social message of the application is prompted in the notification manner determined in step 102.

Figure 1C:
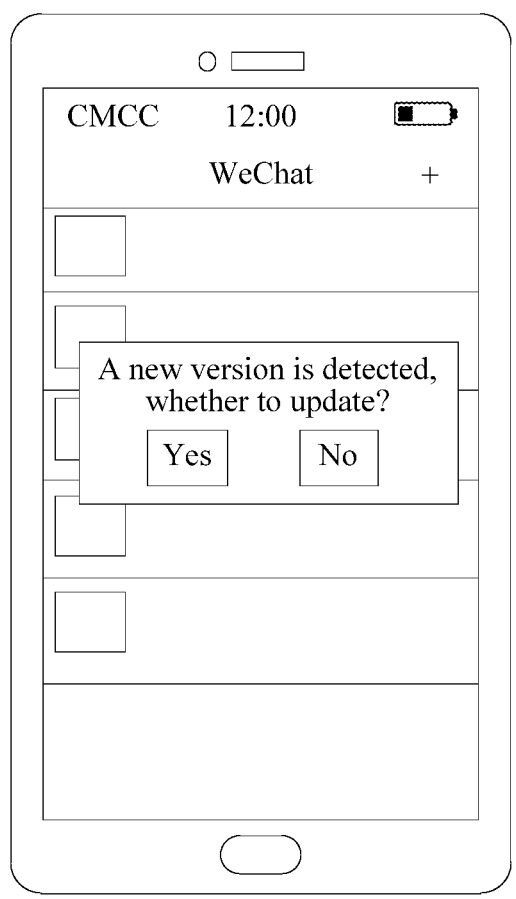
FIG. 1c is an example of a schematic diagram of another message processing method according to an embodiment of the present invention.

Specifically, using WeChat as an example, an update message of WeChat may be set to be prompted by using a pop-up window when WeChat is started, as shown in FIG. 1c. A chat message of WeChat is prompted in the notification manner determined in step 102. If the notification manner of WeChat is important, the chat message of WeChat is prompted by using a pop-up window and is displayed at the top of the notification bar. If the notification manner of WeChat is unimportant, the chat message of WeChat is displayed in the notification bar instead of being prompted by using a pop-up window. When a message of an official account of WeChat is received, the message of the official account is not prompted by using a pop-up window and is not displayed in the notification bar of the terminal. When the user starts WeChat, the unread message of the official account is identified by using a symbol. For example, if a little red point is displayed at the upper right corner of a profile image of the official account, it indicates that there is an unread message in the official account.

In the message notification method provided in this embodiment of the present invention, the terminal may determine the importance level of each application based on the historical use feature of each application, and then determine the notification manner of the notification message of each application based on the importance level of each application, so that when a notification message is received, the notification message is displayed in the notification manner corresponding to the application to which the notification message belongs. Compared with the prior art, not all the notification manners are displayed in a same manner, the importance level of each application may be determined based on the use habit of the user for each application, and the notification message of the application of each importance level corresponds to one notification manner, so that notification messages of applications with different importance levels are displayed in different notification manners. Therefore, a requirement and a habit of the user for viewing the message can be satisfied, thereby improving intelligence for processing the notification message.

A method for determining the importance level of each application based on the use duration, the quantity of times of starting, and the quantity of application download times of each application on the terminal in step 101 is described below.

Use duration of the applications are sorted, the applications are divided into N first type sets in descending order of the use duration, N is a positive integer greater than 1, and serial numbers of the N first type sets are 1 to N. For example, it is assumed that there are nine applications, and the nine applications are an application 1 to an application 9, a first type set 1 is {the application 1, the application 2, and the application 3}, a first type set 2 is {the application 4, the application 5, and the application 6}, and a first type set 3 is {the application 7, the application 8, and the application 9}.

Quantities of times of starting the applications are sorted, the applications are divided into N second type sets in descending order of the quantities of times of starting, and serial numbers of the N second type sets are 1 to N. For example, a second type set 1 is {the application 1, the application 2, and the application 4}, a second type set 2 is {the application 3, the application 5, and the application 6}, and a second type set 3 is {the application 7, the application 8, and the application 9}.

Quantities of application download times of the applications are sorted, the applications are divided into N third type sets in descending order of the quantities of application download times, and serial numbers of the N third type sets are 1 to N. For example, a third type set 1 is {the application 1, the application 3, and the application 5}, a third type set 2 is {the application 2, the application 4, and the application 6}, and a third type set 3 is {the application 7, the application 8, and the application 9}.

In the foregoing processing process, the applications are respectively added into the N first type sets, the N second type sets, and the N third type sets in different manners, and then an identical application is sequentially sifted out from the first type set, the second type set, and the third type set that correspond to each serial number, to form an importance level set corresponding to each serial number. A smaller serial number of the importance level set indicates a higher importance level of the application in the importance level set.

Each time an identical application is sifted out from the first type set, the second type set, and the third type set that correspond to one serial number, the identical application in the first type set, the second type set, and the third type set that correspond to the current serial number is used as the importance level set corresponding to the current serial number, and applications that are not sifted out from the first type set, the second type set, and the third type set that correspond to the current serial number are respectively added to the first type set, the second type set, and the third type set that correspond to a next serial number.

With reference to the foregoing example, an identical application in the first type set {the application 1, the application 2, and the application 3}, the second type set {the application 1, the application 2, and the application 4}, and the third type set {the application 1, the application 3, and the application 5} that correspond to the serial number 1 is the application 1. Therefore, a first importance level set is {the application 1}.

After the first level set is determined, the first type set with the serial number 2 is updated to {the application 2, the application 3, the application 4, the application 5, and the application 6}, the second type set with the serial number 2 is updated to {the application 2, the application 3, the application 4, the application 5, and the application 6}, and the third type set with the serial number 2 is updated to {the application 2, the application 3, the application 4, the application 5, and the application 6}, so that a second importance level set formed by identical applications sifted out from the first type set, the second type set, and the third type set is {the application 2, the application 3, the application 4, the application 5, and the application 6}.

Then, identical applications in the first type set {the application 7, the application 8, and the application 9}, the second type set {the application 7, the application 8, and the application 9}, and the third type set {the application 7, the application 8, and the application 9} that are with the serial number 3 are the application 7, the application 8, and the application 9. Therefore, a third importance level set is {the application 7, the application 8, and the application 9}.

In another example, the applications are sorted based on use duration of the applications, to obtain four first type sets. The four first type sets are respectively a time 1, a time 2, a time 3, and a time 4. The top 20% of the applications whose use duration ranked top form the time 1, the following 30% of the applications form the time 2, the following 30% of the applications form the time 3, and the bottom 20% of the applications form the time 4. The applications are sorted based on the quantities of times of starting, and still based on intervals of 20%, 30%, 30%, and 20% ranked from top to bottom, four second type sets, namely, a count 1, a count 2, a count 3, and a count 4, are sequentially obtained. The applications are sorted based on the quantities of application download times, and still based on the intervals of 20%, 30%, 30%, and 20% ranked from top to bottom, four third type sets, namely, a number 1, a number 2, a number 3, and a number 4, are sequentially obtained. First, an identical application is sifted out from the time 1, the count 1, and the number 1, to form a first importance level set, and then the unselected application in the time 1 is added to the time 2, the unselected application in the count 1 is added to the count 2, and the unselected application in the number 1 is added to the number 2. A second importance level set, a third importance level set, and a fourth importance level set may be sequentially determined based on the method. Importance levels of the applications in the first importance level set, the second importance level set, the third importance level set, and the fourth importance level set decrease sequentially.

Alternatively, identical applications may be sequentially sifted out first from the time 1, the time 2, the time 3, and the time 4 and the count 1, the count 2, the count 3, and the count 4 based on the foregoing method, to obtain four sets, and then the four obtained sets are respectively compared with the number 1, the number 2, the number 3, and the number 4. Finally, the first importance level set, the second importance level set, the third importance level set, and the fourth importance level set are obtained.

Further, after the importance level set is determined, the importance level set is further stored corresponding to the notification manner of the notification message. In this way, after a notification message of the application is received, the notification manner of the notification message may be determined based on the importance level of the application.

For example, a correspondence between the importance level set and the notification manner of the notification message is shown in Table 1:

TABLE 1

| First importance level set (for example, WeChat is included) | The notification message is displayed by using a pop-up window and is prompted through vibration |
|---|---|
| Second importance level set (for example, the microblog is included) | The notification message is displayed in the notification bar and is prompted through vibration |
| Third importance level set (for example, QQ is included) | The notification message is displayed in the notification bar without being prompted through vibration |
| Fourth importance level set | The notification message is not prompted |

It should be noted that the correspondence between the importance level set and the notification manner of the notification message in the foregoing table is merely an example, and a quantity of importance levels and the notification manner corresponding to the application in each importance level may be set based on an actual requirement.

Still with reference to the foregoing table, when receiving a message of WeChat, the terminal may determine that WeChat belongs to the first importance level set, and further determine that the notification manner corresponding to the first importance level set is displaying the notification message by using a pop-up window and prompting the notification message through vibration. Therefore, the terminal displays the message of WeChat in a pop-up window and prompts the message through vibration.

When receiving a message of the microblog, the terminal may determine that the microblog belongs to the second importance level set, and further determine that the notification manner corresponding to the second importance level set is displaying the notification message in the notification bar and prompts the notification message through vibration. Therefore, the terminal displays the message of the microblog in the notification bar and prompts the message through vibration.

Figure 2:
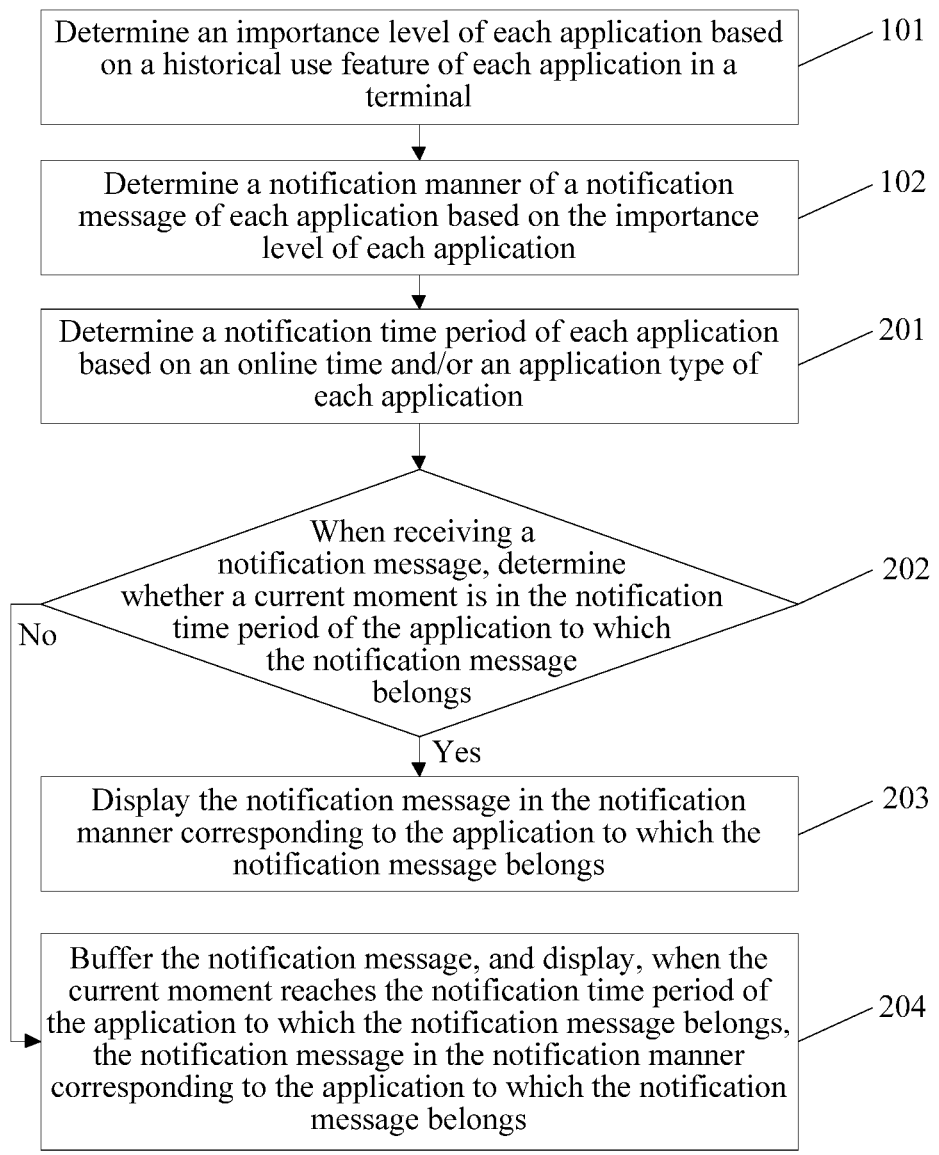
FIG. 2 is a flowchart of another message processing method according to an embodiment of the present invention.

With reference to the method procedure shown in FIG. 1, to more intelligently process the notification message, not only the notification manner of the notification message of each application needs to be determined, but also a notification time period needs to be determined. Based on this, in another implementation according to an embodiment of the present invention, as shown in FIG. 2, the method further includes the following steps.

201. Determine a notification time period of each application based on an online time and/or an application type of each application.

The terminal may determine the notification time period of each application based on the online time of each application, or determine the notification time period of each application based on the application type of each application, or determine the notification time period of each application based on the online time and the application type of each application.

The terminal may determine the application type of each application by itself, or may obtain the application type of each application from the cloud server.

Specifically, one day 24 hours may be divided into a plurality of time segments. For example, one day is divided into a sleep time segment, a dining time segment, a working time segment, a leisure time segment, and the like. Each application type corresponds to a use time segment. For example, a work-type application is usually used in a working time, and an entertainment type application is usually used in a non-working time.

It is determined based on the online time of each application that the user usually uses each application in which time segment, and it is determined with reference to the application type that the notification time period of each application is the sleep time segment, the dining time segment, or the working time segment. If the online time of the application belongs to two time segments, it is determined that the online time of the application in which time segment is longer, and the time segment in which the online time is longer is determined as the notification time period.

For example, if the online time of the application is from 9:30 to 10:30, it may be determined that the online time of the application is in the working time segment, and the application type of the application is the work-type application, so that it may be finally determined that the notification time period of the application is the working time segment.

It may be understood that based on that the notification time period of each application is determined, when the notification message is received, a moment for displaying the notification message further needs to be determined. Therefore, the displaying, when receiving a notification message, the notification message in the notification manner corresponding to the application to which the notification message belongs in step 103 may be specifically implemented as step 202 to step 204.

202. When receiving a notification message, determine whether a current moment is in the notification time period of the application to which the notification message belongs. If current moment is in the notification time period of the application to which the notification message belongs, perform step 204, or if current moment is not in the notification time period of the application to which the notification message belongs, perform step 205.

For example, if the current moment is the working time segment and the notification time period of the application to which the received notification message belongs is also the working time segment, step 203 may be performed, and the notification is immediately displayed in the notification manner of the application to which the notification message belongs.

If the current moment is the working time segment and the notification time period of the application to which the received notification message belongs is the leisure time segment, step 204 is performed, and the notification is displayed in the notification manner of the application to which the notification message belongs in the leisure time segment.

203. Display the notification message in the notification manner corresponding to the application to which the notification message belongs.

204. Buffer the notification message, and display, when the current moment reaches the notification time period of the application to which the notification message belongs, the notification message in the notification manner corresponding to the application to which the notification message belongs.

In the embodiments of the present invention, not only the notification manner corresponding to the notification message of each application needs to be determined, but also the notification time period of each application needs to be determined, so that the notification message may be notified at an appropriate time. Therefore, the user may see an important notification message in time, and do not miss any common notification message, in addition, a useless notification message is prevented from affecting rest or working of the user, thereby further improving the intelligence for processing the notification message.

Figure 3:
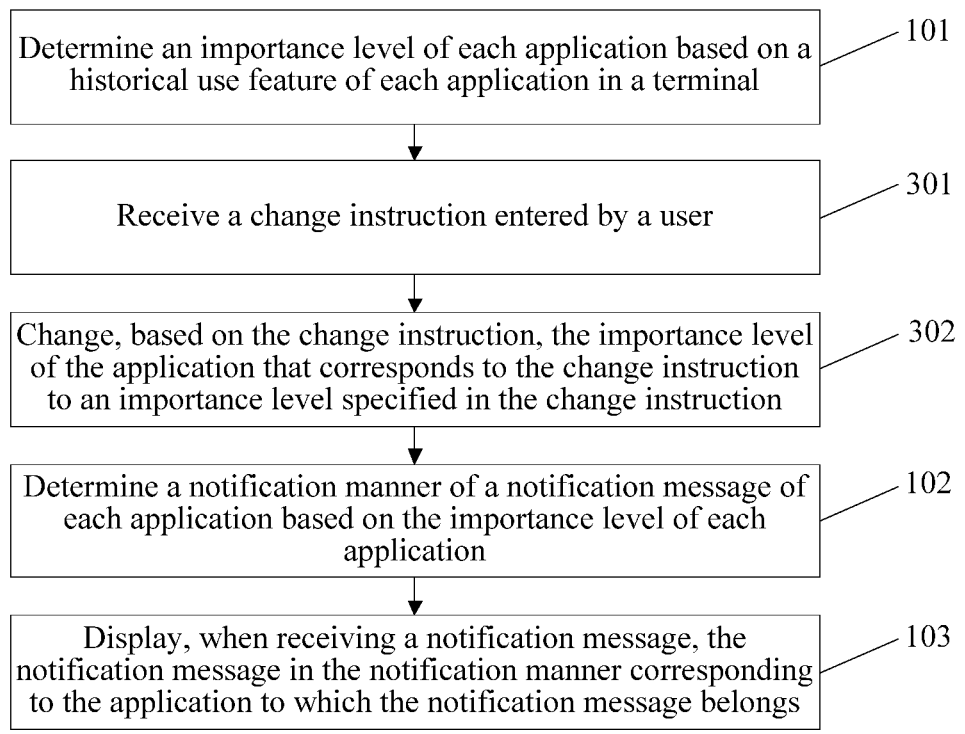
FIG. 3 is a flowchart of another message processing method according to an embodiment of the present invention.

It should be noted that the importance level determined by the terminal based on the use duration and the quantity of download times of the application may not always satisfy a subsequent requirement of the user. For example, the user may use an application that is seldom used because of an important working requirement. To make the notification manner of the notification message and the notification time more satisfy the requirement of the user, the user may also manually adjust the importance level of the application. Based on this, in another implementation according to an embodiment of the present invention, as shown in FIG. 3, after the determining an importance level of each application based on a historical use feature of each application on a terminal in step 101, the method further includes the following steps.

301. Receive a change instruction entered by a user.

The change instruction of the user may carry an importance level of the application, that is, the user may enter the level of the application in an input box. Alternatively, a setting screen of the terminal may display an importance level option of each application, and the change instruction entered by the user is a click operation on the importance level option of the application.

302. Change, based on the change instruction, the importance level of the application that corresponds to the change instruction to an importance level specified in the change instruction.

It may be understood that the importance level specified in the change instruction is the importance level entered by the user or the importance level selected by the user in step 301.

It should be noted that after changing the importance level of the application based on the change instruction entered by the user, the terminal further needs to perform step 102 again, to determine a notification manner of the notification message of each application again.

In addition, the terminal may further receive a notification time period change instruction entered by the user, and change the notification time period of the application based on the notification time period change instruction, so that the user may set the notification time of the application based on a living habit of the user.

In the message processing method provided in the embodiments of the present invention, the terminal may determine the importance level of each application based on the use duration, the quantity of times of starting, and the quantity of application download times of each application, to determine the notification manner of each application, and determine the notification time period of the notification message of each application based on the online time and the application type of each application. Alternatively, the user may set the importance level of the application and the notification time period. Therefore, the notification manner and the notification time of the notification message more satisfy the requirement of the user, thereby improving the intelligence for processing the message.

In the foregoing descriptions, the solutions provided in the embodiments of the present invention are described mainly from a perspective of the terminal. It may be understood that the terminal includes corresponding hardware structures and/or software modules for performing the functions. A person skilled in the art should easily be aware that, in combination with examples of units and algorithm steps described in the embodiments disclosed in this specification, the present invention may be implemented in a hardware form or a form of a combination of hardware and computer software. Whether a function is performed by using hardware or by driving the hardware by the computer software depends on particular applications and design constraints of the technical solutions. A person skilled in the art may use different methods to implement the described functions for each particular application, but it should not be considered that the implementation goes beyond the scope of the present invention.

In the embodiments of the present invention, functional modules of the terminal may be divided based on the foregoing method examples. For example, functional modules may be divided corresponding to the functions, or two or more functions may be integrated into one processing module. The integrated module may be implemented in a form of hardware, or may be implemented in a form of a software functional module. It should be noted that the module division in the embodiments of the present invention is an example, and is merely logical function division. There may be another division manner in an actual implementation.

Figure 4:
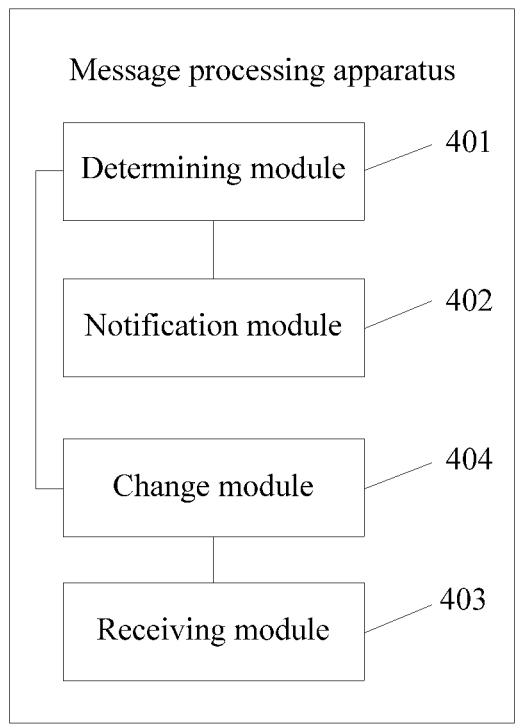
FIG. 4 is a schematic structural diagram of a message processing apparatus according to an embodiment of the present invention.

When the functional modules are divided corresponding to the functions again, an embodiment of the present invention further provides a message processing apparatus. The apparatus may be the terminal in the foregoing embodiments. As shown in FIG. 4, FIG. 4 shows the apparatus in the foregoing embodiments. For example, FIG. 4 is a possible schematic structural diagram of the terminal. The apparatus includes a determining module 401, a notification module 402, a receiving module 403, and a change module 404. The determining module 401 is configured to enable the terminal to perform step 101 and step 102 in FIG. 1 and step 201 and step 202 in FIG. 2. The notification module 402 is configured to enable the terminal to perform step 103 in FIG. 1 and step 203 and step 204 in FIG. 2. The receiving module 403 is configured to enable the terminal to perform step 301 in FIG. 3. The change module 404 is configured to enable the terminal to perform step 302 in FIG. 3. For the functional descriptions of the corresponding functional modules, refer to all related content of the steps in the foregoing method embodiments, and details are not described herein again.

Figure 5:
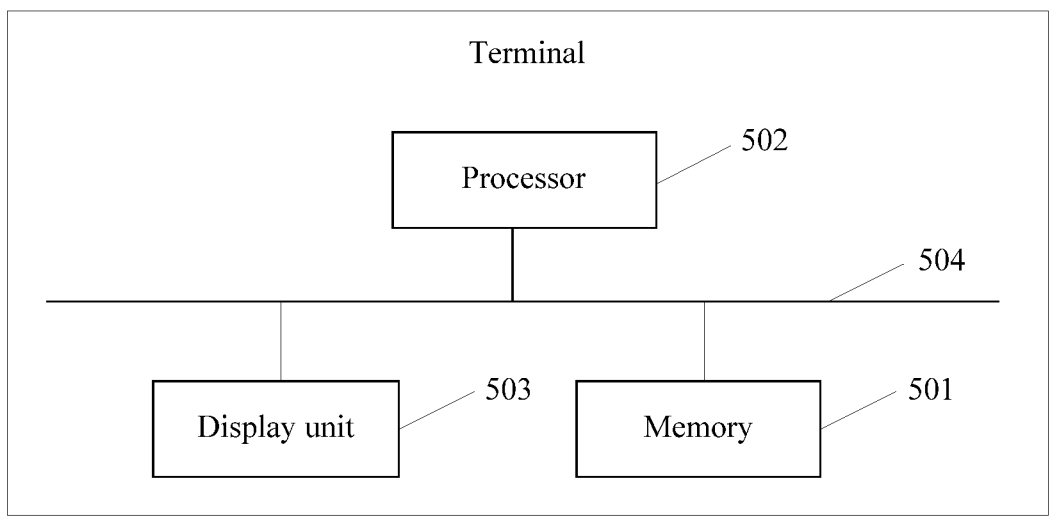
FIG. 5 is a schematic structural diagram of a terminal according to an embodiment of the present invention.

When an integrated unit is used, FIG. 5 is another possible schematic structural diagram of the terminal in the foregoing embodiments of the present invention. As shown in FIG. 5, the terminal includes a processor 502, a display unit 503, a memory 501, and a bus 504. The display unit 503, the processor 502, and the memory 501 are connected to each other by using the bus 504. The bus 504 may be a peripheral component interconnect (PCI) bus, an extended industry standard architecture (EISA) bus, or the like. The bus may be classified into an address bus, a data bus, a control bus, or the like. For ease of representation, the bus in FIG. 5 is represented by using only one bold line, but this does not indicate that there is only one bus or only one type of bus.

The memory 501 is configured to store program code and data of the terminal. The display unit 503 is configured to display the notification message under control of the processor 502. The processor 502 is configured to control and manage an operation of the terminal. For example, the processor 502 is configured to enable the terminal to perform step 101 to step 103 in FIG. 1, step 101 and step 202 in FIG. 2, and step 302 in FIG. 3, and/or another process of the technology described in this specification.

Method or algorithm steps described in combination with the content disclosed in the present invention may be implemented by using hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or a storage medium of any other form well-known in the art. For example, a storage medium is coupled to a processor, so that the processor can read information from the storage medium or write information into the storage medium. Certainly, the storage medium may alternatively be a component of the processor. The processor and the storage medium may be located in an application specific integrated circuit (ASIC). In addition, the ASIC may be located in a core network interface device. Certainly, the processor and the storage medium may exist in the core network interface device as discrete components.

Based on the foregoing descriptions of the implementations, a person skilled in the art may clearly understand that the present invention may be implemented by using software in addition to necessary universal hardware or by using hardware only. In most circumstances, the former is a preferred implementation. Based on such an understanding, the technical solutions of the present invention essentially or the part contributing to the prior art may be implemented in a form of a software product. The software product is stored in a readable storage medium, such as a floppy disk, a hard disk, or an optical disc of a computer, and includes several instructions for instructing a computer device (which may be a personal computer, a server, or a network device) to perform the methods described in the embodiments of the present invention.

The foregoing descriptions are merely specific implementations of the present invention, but are not intended to limit the protection scope of the present invention. Any variation or replacement within the technical scope disclosed in the present invention shall fall within the protection scope of the present invention. Therefore, the protection scope of the present invention shall be subject to the protection scope of the claims.

What is claimed is:

1. An electronic device, comprising:
a processor; and
a non-transitory computer-readable storage medium storing a program to be executed by the processor, the program comprising instructions to cause the electronic device to:
receive a first notification message of a first application;
determine a first importance level of the first notification message based on a historical use feature on the electronic device, wherein the first importance level is first level;
determine a first notification manner of the first notification message based on the first level;
display the first notification message in the first notification manner, wherein the first notification message corresponding to the first level is displayed in a notification bar;
receive a second notification message of the first application;
determine a second importance level of the second notification message based on the historical use feature on the electronic device, wherein the second importance level is second level;
determine a second notification manner of the second notification message based on the second level; and
display the second notification message in the second notification manner, wherein the second notification message corresponding to the second level is not displayed in the notification bar, wherein the second level is of lower importance than the first level.

2. The electronic device of claim 1, wherein the instructions further cause the electronic device to display the first notification message on a lock screen interface of the electronic device based on a screen-locked state of the electronic device.

3. The electronic device of claim 1, wherein the instructions further cause the electronic device to:
receive a third notification message of a second application;
determine a third importance level of the third notification message based on a historical use feature on the electronic device, wherein the third importance level is first level;
determine the first notification manner of the third notification message based on the first level; and
display the third notification message in the first notification manner, wherein the third notification message corresponding to the first level is displayed in a notification bar.

4. The electronic device of claim 1, wherein the historical use feature on the electronic device comprises a use habit of a user on the electronic device.

5. The electronic device of claim 1, wherein the first importance level is important, and the second importance level is unimportant.

6. The electronic device of claim 1, wherein the first notification message comprises first type of notification message of the first application, and the second notification message comprises second type of notification message of the first application.

7. A message processing method, comprising:
receiving a first notification message of a first application;
determining a first importance level of the first notification message based on a historical use feature on an electronic device, wherein the first importance level is first level;
determining a first notification manner of the first notification message based on the first level; and
displaying the first notification message in the first notification manner, wherein the first notification message corresponding to the first level is displayed in a notification bar; and
receiving a second notification message of the first application;
determining a second importance level of the second notification message based on the historical use feature on the electronic device, wherein the second importance level is second level;

determining a second notification manner of the second notification message based on the second level; and displaying the second notification message in the second notification manner, wherein the second notification message corresponding to the second level is not displayed in the notification bar, and wherein the second level is of lower importance than the first level.

8. The message processing method of claim 7, the method further comprising displaying the first notification message on a lock screen interface of the electronic device based on a screen-locked state of the electronic device.

9. The message processing method of claim 7, the method further comprising steps for:

receiving a third notification message of a second application;

determining a third importance level of the third notification message based on a historical use feature on the electronic device, wherein the third importance level is first level;

determining the first notification manner of the third notification message based on the first level; and displaying the third notification message in the first notification manner, wherein the third notification message corresponding to the first level is displayed in a notification bar.

10. The message processing method of claim 7, wherein the historical use feature on the electronic device comprises use habit of a user on the electronic device.

11. The message processing method of claim 7, wherein the first importance level is important, and the second importance level is unimportant.

12. The message processing method of claim 7, wherein the first notification message comprises first type of notification message of the first application, and the second notification message comprises second type of notification message of the first application.

13. An electronic device, comprising:

a processor; and a non-transitory computer-readable storage medium storing a program to be executed by the processor, the program comprising instructions to cause the electronic device to:

receive a first notification message of a first application;

determine a first level of the first notification message according to the first application;

determine a first notification manner of the first notification message based on the first level;

display the first notification message in the first notification manner, wherein the first notification message corresponding to the first level is displayed in a notification bar; and receive a second notification message of a second application;

determine a second level of the second notification message according to the second application;

determine a second notification manner of the second notification message based on the second level; and display the second notification message in the second notification manner, wherein the second notification message corresponding to the second level is not displayed in the notification bar, wherein the second level is of lower importance than the first level.

14. The electronic device of claim 13, wherein the instructions further cause the electronic device to:

receive a first operation to the first application from a user; and set an importance level of the first notification message of the first application to the first level.

15. The electronic device of claim 13, wherein the instructions further cause the electronic device to:

receive a second operation to the second application from a user; and set an importance level of the second notification message of the second application to the second level.

16. The electronic device of claim 14, wherein the instructions further cause the electronic device to:

receive a third operation to the first application from the user; and change the importance level of the first notification message of the first application from the first level to the second level.

17. The electronic device of claim 16, wherein the instructions further cause the electronic device to:

receive a third notification message of the first application;

determine a second level of the third notification message according to the first application;

determine the second notification manner of the third notification message based on the second level; and display the third notification message in the second notification manner, wherein the third notification message corresponding to the second level is not displayed in the notification bar.

18. The electronic device of claim 13, wherein the instructions further cause the electronic device to display the first notification message on a lock screen interface of the electronic device based on a screen-locked state of the electronic device.

19. The electronic device of claim 15, wherein the instructions further cause the electronic device to:

receive a fourth operation to the second application from the user; and change the importance level of the second notification message of the second application from the second level to the first level.

20. The electronic device of claim 19, wherein the instructions further cause the electronic device to:

receive a fourth notification message of the second application;

determine a first level of the fourth notification message according to the second application;

determine the first notification manner of the fourth notification message based on the first level; and display the fourth notification message in the first notification manner, wherein the fourth notification message corresponding to the first level is displayed in the notification bar.

* * * * *